United States Patent
Stumpp et al.

(10) Patent No.: US 9,718,136 B2
(45) Date of Patent: Aug. 1, 2017

(54) DRILL

(71) Applicant: DreBo Werkzeugfabrik GmbH, Athshausen (DE)

(72) Inventors: Martin Stumpp, Ravensburg (DE); Alexander Zurn, Altshausen (DE); Peter Kehrle, Biberach (DE); Tobias Berg, Pfullendorf (DE)

(73) Assignee: DreBo Werkzeugfabrik GmbH, Athshausen (DE)

( * ) Notice: Subject to any disclaimer, the term of this patent is extended or adjusted under 35 U.S.C. 154(b) by 111 days.

(21) Appl. No.: 14/536,233

(22) Filed: Nov. 7, 2014

(65) Prior Publication Data

US 2016/0129506 A1 May 12, 2016

(51) Int. Cl.
   *B23B 51/02* (2006.01)
(52) U.S. Cl.
   CPC .......... *B23B 51/02* (2013.01); *B23B 2226/75* (2013.01); *B23B 2251/046* (2013.01); *B23B 2251/241* (2013.01); *B23B 2251/245* (2013.01); *B23B 2251/406* (2013.01); *B23B 2251/44* (2013.01); *B23B 2251/446* (2013.01); *Y10T 408/9097* (2015.01)
(58) Field of Classification Search
   CPC ........ B23B 2251/245; B23B 2251/241; B23B 2251/44; B23B 2251/443; B23B 2251/446; B23B 51/02; E21B 10/44; E21B 10/445; Y10T 408/9097
   USPC ........................................ 175/395
   See application file for complete search history.

(56) References Cited

U.S. PATENT DOCUMENTS

| 940,426 A | * | 11/1909 | Caldwell ................. | B23B 51/02 408/212 |
| 5,888,036 A | * | 3/1999 | Arai ........................ | B23B 51/02 408/230 |

(Continued)

FOREIGN PATENT DOCUMENTS

| CH | 517245 | * 12/1971 | ........... E21B 10/445 |
| DE | 2013328 B1 | * 7/1971 | ........... E21B 10/445 |

(Continued)

OTHER PUBLICATIONS

Description DE29724063 available at http://translationportal.epo.org/emtp/translate?ACTION=description-retrieval&COUNTRY=DE&ENGINE=google&FORMAT=docdb&KIND=U1&LOCALE=en_EP&NUMBER=29724063&OPS=ops.epo.org%2F3.1&SRCLANG=de&TRGLANG=en&apikey=TSMqTfrVAvNtryGl8Qlfbozj8DnAGlqJ&PDF=true (last visited Apr. 8, 2016).*

(Continued)

*Primary Examiner* — Sunil K Singh
*Assistant Examiner* — Ryan Rufo
(74) *Attorney, Agent, or Firm* — Johnson, Marcou & Isaacs, LLC; Jennifer S. Stachniak

(57) ABSTRACT

A drill with a drill flute (12) includes symmetrical fluted lands (20) helically extend around a core, wherein grooves (18) remain between the fluted lands, said grooves having a width (72) that exceeds the spine thickness or width (24) of the fluted lands (20), and wherein the grooves (18) comprise a convex core reinforcement (22) at the groove bottom thereof. The width (24) of the fluted lands (20) at the drill head side end (16) is smaller than at the shank side end (14) of the drill helix (12), and at least increases in certain areas. The core reinforcement (22) at the drill head side end (16)

(Continued)

is more convex than at the shank side end (14), thus has larger radii (40, 42).

19 Claims, 4 Drawing Sheets

(56) References Cited

U.S. PATENT DOCUMENTS

| | | | | |
|---|---|---|---|---|
| 6,250,857 | B1 * | 6/2001 | Kersten | B23B 51/02 |
| | | | | 175/394 |
| 6,675,917 | B2 * | 1/2004 | Kleine | B23B 51/02 |
| | | | | 175/323 |
| 2009/0277691 | A1 * | 11/2009 | Geier | B23B 51/02 |
| | | | | 175/394 |

FOREIGN PATENT DOCUMENTS

| | | | | |
|---|---|---|---|---|
| DE | 4117486 A1 * | 12/1992 | | B23B 51/02 |
| DE | 29724063 U1 * | 11/1999 | | B23B 51/02 |
| DE | 102009023299 A1 * | 12/2010 | | B23B 51/02 |
| EP | 2669033 A1 * | 12/2013 | | E21B 10/44 |
| JP | 55-058907 A * | 5/1980 | | B23B 51/02 |
| JP | 2006-198724 A * | 8/2006 | | B23B 51/00 |

OTHER PUBLICATIONS

Description CH517245 available at http://translationportal.epo.org/emtp/translate?ACTION=description-retrieval&COUNTRY=CH&ENGINE=google&FORMAT=docdb&KIND=A&LOCALE=en_EP&NUMBER=517245&OPS=ops.epo.org%2F3.1&SRCLANG=de&TRGLANG=en&apikey=TSMqtfrVAvNtryGl8Qlfbozj8DnAGlqJ&PDF=true (last visited Apr. 8, 2016).*

* cited by examiner

DRILL

The instant application should be granted the priority date of Sep. 6, 2013, the filing date of the corresponding German patent application DE 10 2013 109 796.

BACKGROUND OF THE INVENTION

The invention relates to a drill, in particular to a rock drill with a drill head equipped with a hard metal insert.

A drill of this kind is known from DE 197 27 070 C2. This drill with a core reinforcement in practice has turned out to be particularly efficient and durable.

This type of drill is still used today as a so-called four-flute cutter and offers the possibility to combine a good stability and a relatively large drill dust removal groove. The core reinforcement makes it possible to work with a quite thin core resulting in a correspondingly large drill dust removal groove, but nevertheless on the other hand makes it possible to reduce the tendency to break due to the effected reinforcement of the core.

By core reinforcement a convexity in the direction of the drill longitudinal axis is understood, that is to say a convex structure of the drill core within each drill dust removal groove if viewed at a longitudinal section of the drill.

On the other hand, the invention is based on the object of providing a drill, whose long-term stability and resistance to breakage are still further enhanced.

SUMMARY OF THE INVENTION

According to the invention a drill with a core reinforcement is provided whose spinal width of the fluted land at the drill head side end is smaller than at the shank side end of the fluted lands or the drill helix. Hereby, the tendency of the drills to break at the transition between the cylindrical part of the drill at the shank side end thereof and the drill helix, is eliminated by surprisingly simple means. Due to the increase of the spine thickness or width at this position or due the broadening of the spinal fluted lands the notch effect at this position is significantly reduced.

At the same time the drill at this position becomes more rigid and thus the transfer of the impact energy to the drill tip is improved.

The drill tip in a manner known per se is provided with a drill head comprising a hard metal insert. The inventive drill is thus especially suitable for rock, etc.

According to the invention, it is provided to configure the core reinforcement at the shank side end to be more slender, i.e. less convex. The rigidity and stability of the core hereby are not influenced at all or only to a very small extent because the absolute depth of the drill dust removal groove at the tip of the core reinforcement remains unchanged. However, more space for the drill dust removal is created due to the more slender configuration by still increasing the volume of the drill dust removal groove to the side of the center of the core reinforcement. This compensates by far the reduction of volume or free space per axial length section of the drill in the area of the shank side end of the helix that is available for the drill dust removal.

At the drill head side end of the helix, the spine width of the fluted lands is correspondingly smaller than at the shank side end. Hereby, the drill itself is less rigid at this position. Due to the more convex configuration of the core reinforcement, that is to say a configuration with larger radii of convexity if viewed in the longitudinal section of the drill, however, a higher mass helix section is available that correspondingly better transfers the impact energy introduced.

In this respect, the core reinforcement is inventively configured to be more rigid at the position at which the drill is weakened by a weaker helix, and less rigid at the position at which the drill is more rigid due to a more rigid helix comprising a broader spine.

Thus, it is possible in a surprisingly simple manner to compensate for the tendency of breakage of the drills used so far, in particular of the drills without a core reinforcement, at those positions at which the drill tends to break, namely in particular at the transition between the shank and the drill helix.

A further advantage arises from the reduction of the spine width in the front region of the drill. Due to the narrower spinal fluted lands there is a smaller contact surface between the drill hole and the drill. Less friction is produced resulting in an increase of the drilling progress, especially also during the production of a drill hole. The front part of the drill is in contact with the drill hole already at the beginning of the drilling process, and the friction thereof significantly determines the drilling performance.

Due to the groove space that has been enlarged in the rear area, a larger volume is available for the reception of drill dust. Hereby, the tendency for deflagrations at a nearly finished drill hole is reduced.

It is particularly advantageous that due to the steeper helix angles of the drill helix, the shock wave introduced into the drill from the shank end, can be better introduced into the drill helix, thus introducing more impact energy into the drill head which increases the drill performance.

In an advantageous embodiment, the change of shape of the core reinforcement is symmetrical, that is to say in mirror image relative to one another on both faces of the core reinforcement. In this manner the maximum possible volume enlargement is achieved that at the same time prevents a weakening of the core reinforcement.

In a further advantageous embodiment, the core thickness of the drill, measured against the tip or center of the core reinforcement, is constant along the contour of the helix. Hereby, a weakening of the drill and a reduction of the rigidity due to a possible reduction of the core diameter is avoided.

According to the invention a particularly advantageous combination of a variable core reinforcement is combined with a drill helix that is variable as to the form of the variable spine thickness or width of the fluted land.

According to the invention the shape of the core reinforcement changes along the contour of the drill. The area of the core reinforcement in a favorable configuration is reduced towards the shank side end of the helix.

Due to the change of the fluted land width along the contour of the drill helix, the fluted land has a different mass if viewed along the contour of the drill helix. This surprisingly results in the avoidance of vibrancy due to the introduced longitudinal pulses of the impact energy.

In a further advantageous embodiment of the invention it is provided to increase the width of the fluted lands at the drill head side end and to configure the core reinforcement at this position more slender and thus narrower than at the shank side end. This design has the particular advantage that at the position at which the wear of the fluted land is biggest, the largest fluted land mass is available. Said position, that is to say the drill head side end of the transport helix is most frequently in contact with the drill hole surrounding the drill and is thus subjected to the heaviest wear. In this respect, in this configuration a particularly favorable wear compensation is present.

BRIEF DESCRIPTION OF THE DRAWINGS

Further advantages, details and features of the invention emerge from the subsequent description of two embodiments of the invention based on the drawing in which.

DETAILED DESCRIPTION OF THE PREFERRED EMBODIMENTS

Figure 1:
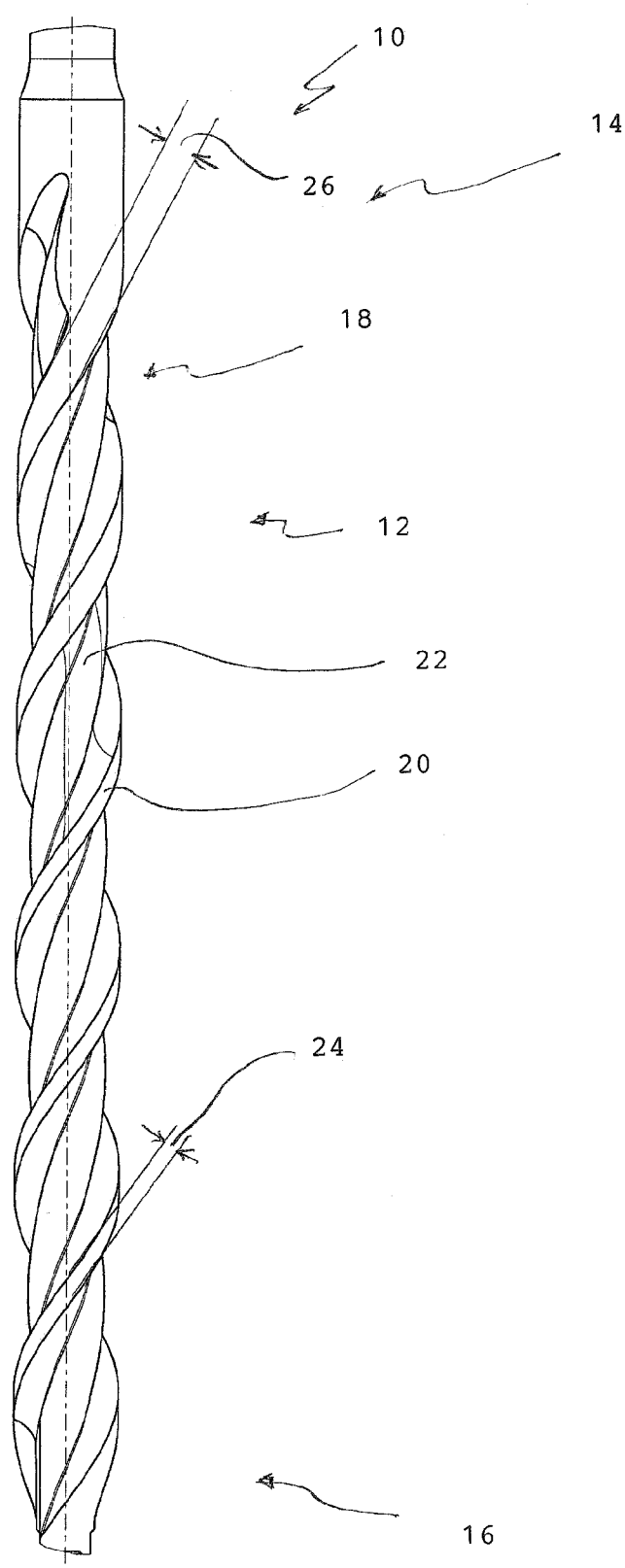
FIG. 1 is a side view of a substantial part of an embodiment of an inventive drill.

The drill 10 illustrated in FIG. 1 comprises a drill helix 12 that extends from a shank end 14, also referred to as a rear end, to a front end or drill head end 16.

The drill 10 comprises in a manner known per se a drill dust removal groove 18 in the area of the helix, said drill dust removal groove 18 being configured in a helically circulating manner. In a manner known per se as well, a spine fluted land 20 is also configured in a helically circulating manner in the same direction, which spine fluted land 20 is inventively configured in a special manner as described in the following.

The drill dust removal groove 18 comprises a core reinforcement 22. The core reinforcement 22 is designed more convex in the area of the drill head end 16 and more acute or slenderer in the sense of a reduced cross-section of the core reinforcement in the area of the shank end 14. As far as the individual shape of the core reinforcement 22 is concerned, it is referred to FIGS. 2 and 3.

According to the invention the width 24 of the fluted land 20 in the area of the drill head 16 is relatively narrow and the width 26 of the fluted land 20 in the area of the shank end 24 is large. In the illustrated exemplary embodiment that shows a drill with a nominal diameter of 14 mm, the width 24 at the drill head end 16 amounts to 2 mm and the width 26 at the shank end 14 amounts to 5 mm.

It is to be understood that the ratio of the spine widths 24 to 26 may be adapted to the requirements in many areas. For example the width ratio may amount to 1 to 1.2 or 1 to 6. It is preferred that the ratio of the spine fluted lands widths amounts to between 1 to 1.5 and 1 to 3.5, particularly preferred to between 1 to 2 and 1 to 3.

According to the invention it is further provided that the core reinforcement 22 in its design changes in the opposite direction compared to the change of the width 24 or 26, respectively. The core reinforcement 22 is thus broader in the area of the drill head end 16, i.e. at the position at which the width 24 of the fluted land 20 is narrower, and in the area of the shank end 14, at which position the width 26 of the fluted land 20 is broader, it is narrower. The result is the desired compensation of the relatively narrower drill dust removal groove 18 in the area of the shank end 14 due to the larger width 24, and thus a relative enlargement of the drill dust removal groove 18 despite an increased rigidity is provided.

Figure 2:
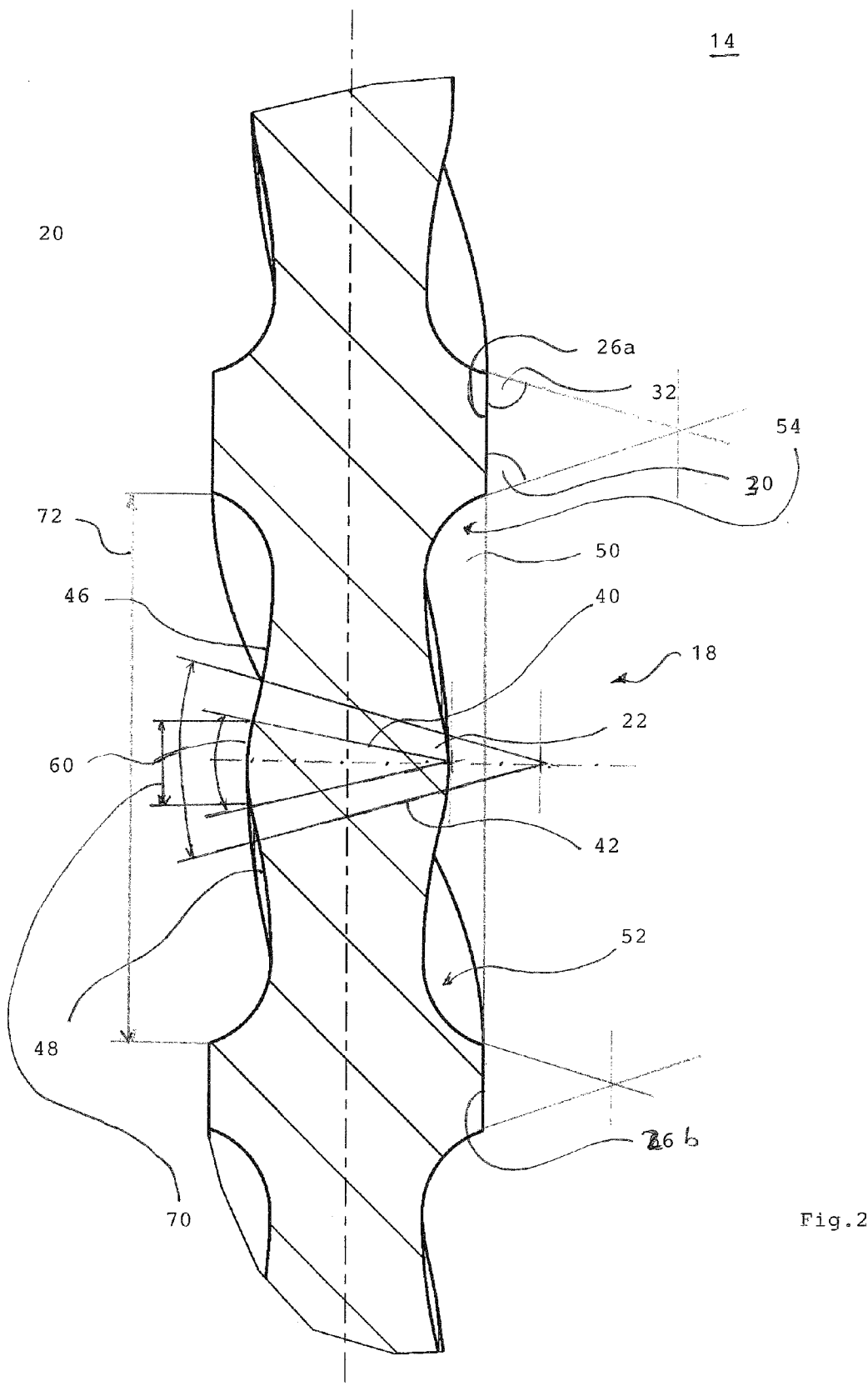
FIG. 2 is an enlarged longitudinal sectional view of a detail of the drill according to FIG. 1 in the rear or shank side end region of the drill.

FIG. 2 illustrates in which manner the drill dust removal groove 18 and the fluted land 20 are designed at this position, i.e. in the area 14 of the shank end, and how the groove changes along the contour thereof.

As it can be seen in FIG. 2, two turns of the helix are illustrated. The shank end side fluted land width 26a is larger than the fluted land width 26b facing towards the drill head.

The drill dust removal groove 18 comprises symmetrical exit angles 30 and 32. The term exit angle refers to the final angles of the drill dust removal groove 18 relative to the fluted land 20, i.e. at the transition between the drill dust removal groove 18 and the fluted land 20.

The exit angle 30 at the drill head side end of the fluted land 20 correspondingly is exactly as large as the exit angle 32 at the shank side end of the fluted land 20.

In the illustrated exemplary embodiment, said angle amounts to 72°, however, it can be adapted to the requirements in large areas. In order to limit the wear and in order to prevent the drill from getting stuck, the angle in any case should amount to significantly less than 85° if possible, preferably less than 80°.

The drill dust removal groove 18 is designed with the core reinforcement 22 in a particular manner. In the area 14 of the drill the core reinforcement 22 is quite slender. Its central radius 40, i.e. the radius of convexity in the view according to FIG. 2 in the immediate neighborhood to the center of the core reinforcement 22, is quite small. In the illustrated exemplary embodiment the radius amounts to significantly less than the nominal diameter of the drill, that is to say to approximately half the nominal diameter. Said radius is detected via the central 20° of the convex core reinforcement 22.

On the other hand, the side radius 42 is significantly larger. In the illustrated exemplary embodiment it amounts to somewhat less than the nominal diameter of the drill that is somewhat larger than the diameter of the drill in the area of the fluted land 20 due to the hard metal tip that protrudes in a manner known per se. The radius, however, can also be somewhat larger than the nominal diameter and may be preferably detected as an angle of about 35° via the central convexity of the core reinforcement 22.

Due to this design the side faces of the core reinforcement 22, that is to say the front face 46 facing the drill head and the rear side face 48, are straight sloping and flat. The tilt angle towards the drill axis amounts to between 5 and 18 degrees and in the illustrated exemplary embodiment approximately to 10 degrees.

Due to this design with flat side faces, the core reinforcement 22 becomes more acute and narrower.

This benefits the volume 50 of the drill dust removal groove 18 that is thus enlarged in the area of the lateral chamfers 52 and 54 of the drill dust removal groove 18.

When viewed from the exit angle 30 or 32, respectively, the drill dust removal groove 18 comprises an involute-like structure in the area of the chamfers 52 and 54, in fact nearly to the point at which it merges into the center 60 of the core reinforcement.

Figure 3:
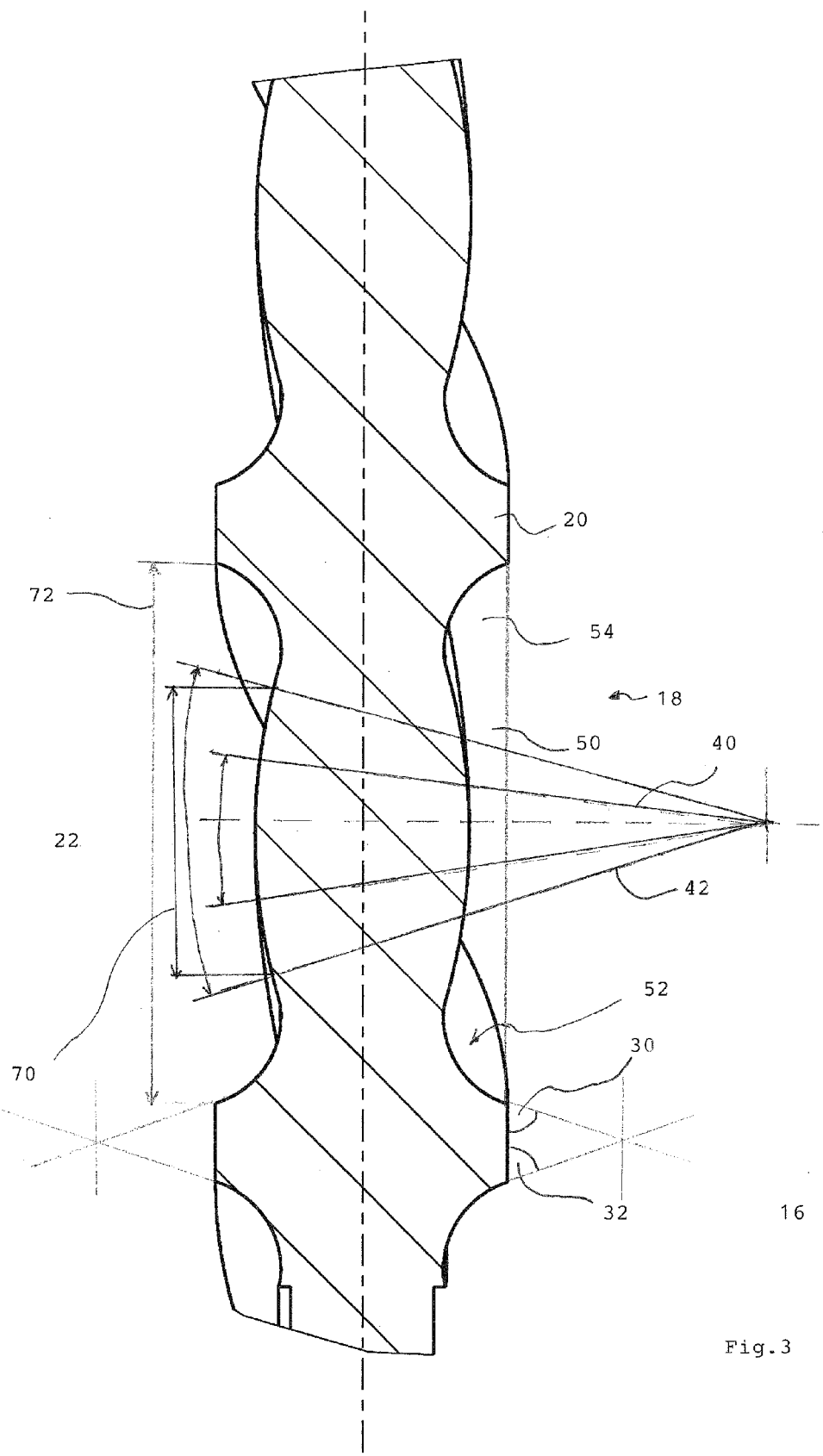
FIG. 3 illustrates a sectional view similar to FIG. 2, however of a drill head side end region or front end region of the drill according to FIG. 1.

Contrary thereto, a different drill dust removal groove 18 can be seen in FIG. 3; FIG. 3 illustrates the design of the drill dust removal groove 18 and of the core reinforcement 22 in the area of the drill head side end of the helix. In this view according to FIG. 3, i.e. viewed in the longitudinal section through the drill, the core reinforcement 22 is significantly more convex. The result is that the central radius 40 and the side radius 42 coincide and in total are significantly larger than the respective radii according to FIG. 2. In the illustrated exemplary embodiment, both radii are approximately as big as twice the nominal diameter of the drill 10.

The contour of the chamfers 52 and 54 is such that they quite fast merge into the convexity of the core reinforcement 22 when viewed from the exit angles 30 or 32, respectively. In this design, the concave area of the chamfers 52 and 54 is immediately followed by the convex area of the core reinforcement 22. The area of convexity of the core reinforcement 22 in this design has a convexity width 70 that is significantly enlarged as compared to the the convexity width 70 according to FIG. 2. The width amounts to significantly more than half the width 72 of the drill dust removal groove 18. The width ratio at the drill head side end according to FIG. 3 amounts to approximately 0.8 to 1, whereas it amounts to approximately 0.2 to 1 at the shank side end.

It is to be understood that the ratio of the convexity width 70 to the drill dust removal groove width 72 may be adapted to the requirements in large areas and that in case of a relatively larger convexity width, a more convex design of the core reinforcement is contemplated.

Whereas with the drills illustrated here, a spiral having two flutes is provided which spiral is typically used with so-called two-flute cutters, it is to be understood that instead the same effects may be achieved with four-flute spirals or drill helices, as they are typical with four-flute cutters. A correspondingly designed drill helix 12 becomes apparent from FIG. 4.

Here, as well as in the remaining figures, same reference numerals refer to the same parts and do not require further reference thereto. The width ratio of the widths 24 and 26 of the fluted lands 20 here amounts to 1 to 2, and the core reinforcement 22 changes as described before in the opposite direction as compared to the width change of the fluted lands 20.

The same applies analogously to three-flute cutters and other multi-flute cutters.

Figure 4:
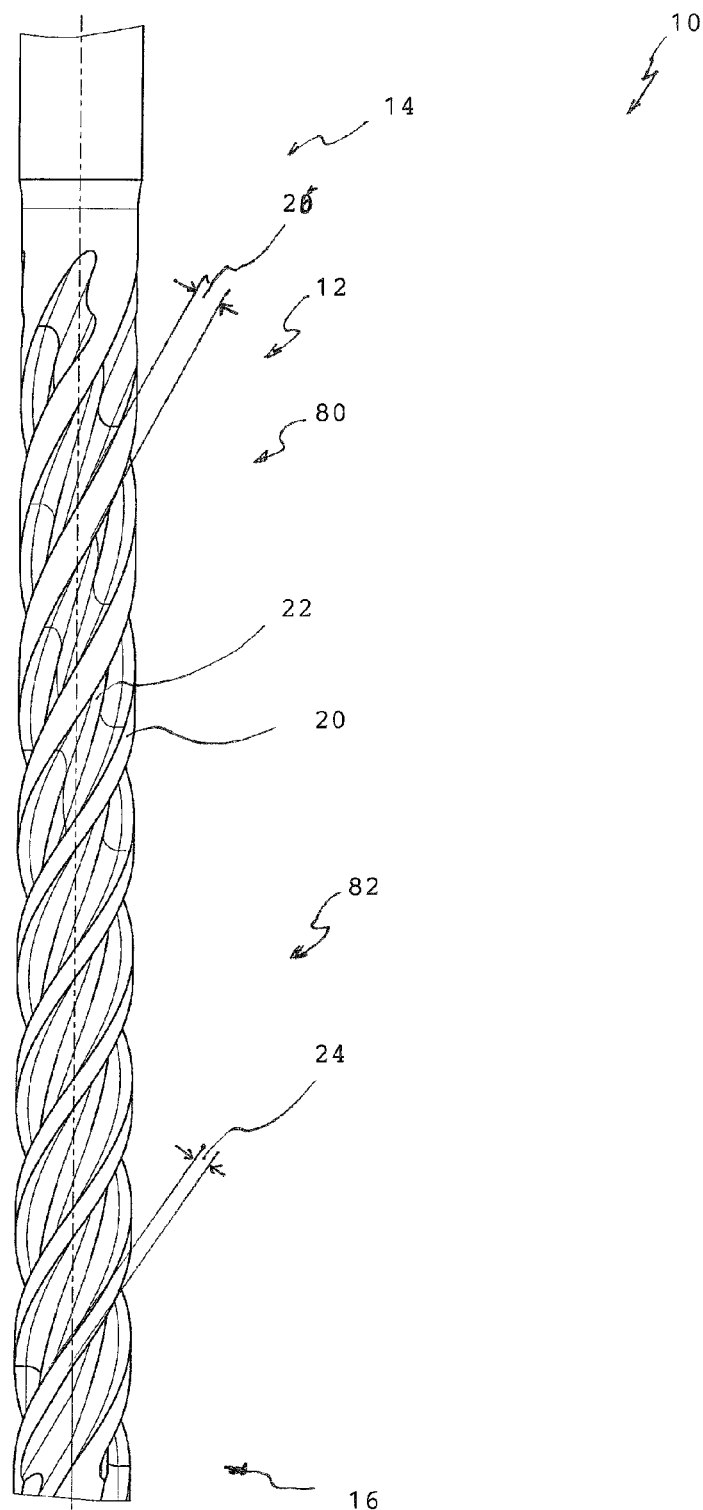
FIG. 4 illustrates a view of a further embodiment of an inventive drill in a representation according to FIG. 1.

As it becomes apparent from FIG. 4, the rearward third 80 is equipped with a larger fluted land width 26, and the two front thirds 82 of the drill 10 comprise a smaller fluted land width 24. In between a continuous transition extends.

The result is that the change of shape of the core reinforcement 22 and the change of the fluted land widths 24 or 26, respectively, has not to take place continuously and steadily along the contour of the drill 10, but that a change section by section is also sufficient should the occasion arise.

The specification incorporates by reference the disclosure of German patent application DE 10 2013 109 796, filed Sep. 6, 2013.

The present invention is, of course, in no way restricted to the specific disclosure of the specification and drawings, but also encompasses any modifications within the scope of the appended claims.

We claim:

1. A drill, said drill comprising:
   a drill helix (12) having a core, a drill end (16) and a shank end (14) and fluted lands (20) helically extending around the core, wherein said fluted lands are symmetrical in a cross sectional view taken perpendicularly to a longitudinal axis of the drill, wherein grooves (18) remain between the fluted lands, said grooves (18) having a width (72) that exceeds a spine width (24) of the fluted lands (20), and wherein the grooves (18) comprise a convex core reinforcement (22) at a groove bottom thereof,
   wherein the spine width (24) of the fluted lands (20) at an area disposed near a drill end (16) is smaller than at an area disposed near the shank end (14) of the drill helix (12) and increases in certain areas, and wherein a cross sectional maximum width of the core reinforcement (22) taken perpendicular to a longitudinal axis of the drill is greater at the drill end (16) of the core reinforcement (22) than a cross sectional maximum width of the core reinforcement (22) taken perpendicular to the longitudinal axis of the drill at the shank end (14) of the core reinforcement (22).

2. The drill according to claim 1, wherein the core reinforcement (22) of the drill (10) in the area of the drill head comprises a substantially constant radius (40, 42) along a contour thereof within the drilling dust removal groove (18).

3. The drill according to claim 1, wherein the core reinforcement (22) in the area of the shank end (14) of the drill (10) comprises variable radii (40, 42) along the contour thereof, wherein the radius (40) is smallest in the center of the core reinforcement and increases at two faces of the core reinforcement (22) starting from the center (60).

4. The drill according to claim 1, wherein a helical pitch that increases towards the drill shank side end (14) is exclusively realized by an increase of the width of the fluted land (24, 26), and wherein the width (72) of the grooves (18) between the fluted lands (20) is constant if viewed along the contour of the helix (12).

5. The drill according to claim 1, wherein a helical pitch and the width of the fluted land (24, 26) are largest at the shank end (14) of the helix (12) when viewed along the contour thereof.

6. The drill according to claim 1, wherein the helix comprises a larger width of the fluted land (26) in the area of the shank end in a rear third of the helix than at the drill end.

7. The drill according to claim 6, wherein the width of the fluted land (26) in the area of the shank end in the rear third of the helix is twice a large as a width at the drill end.

8. The drill according to claim 1, wherein the fluted land widths (24) increase at a selected position on said core relative to fluted land widths positioned on said core before said selected position, wherein the fluted land widths positioned before said selected position vary, and wherein an increase to at least one and a half times the fluted land width (26) takes place within at most two turns of the fluted lands from the drill end.

9. The drill according to claim 1, wherein the core reinforcement (22) is broader in an area of the drill head end 16 than in an area of the shank end (14).

10. The drill according to claim 1, wherein a radius (40, 42) of the core reinforcement (22) decreases along the contour of the helix (12) towards the shaft end (14), and wherein adjacent to the shaft end (14), a change in radius between the highest point in a center (60) of the core reinforcement (22) and faces of the core reinforcement (22) is larger than at the drill head end of the helix.

11. The drill according to claim 1, wherein a change of the core reinforcement (22) at a forward face (48) of the core reinforcement (22) and a rear face (46) of the core reinforcement (22) takes place symmetrically, and wherein the core reinforcement (22) symmetrically changes along the contour of the helix (12).

12. The drill according to claim 11, wherein the forward and rear faces (46, 48) and chamfers (52, 54) of the drill dust removal groove (18) also in the case of a changing core reinforcement (22) symmetrically merge with a respective adjacent fluted land (20) of the helix (12) with an exit angle (30, 32) between 60 and 80 degrees.

13. The drill according to claim 12, wherein the forward and rear faces (46, 48) and the chamfers (52, 54) of the drill dust removal groove (18) also in the case of a changing core reinforcement (22) symmetrically merge with the respective adjacent fluted land (20) of the helix (12) with an exit angle (30, 32) approximately between 70 and 75 degrees.

14. The drill according to claim 1, wherein the core reinforcement (22), if viewed in the longitudinal section of the drill (10), comprises a substantially parabolic contour at the shank end (14) between lateral chamfers (52, 54).

15. The drill according to claim 1, wherein the core reinforcement (22) has larger radii (40, 42) of convexity at the drill end (16) of the core reinforcement (22) than at the shank end (14) of the core reinforcement (22).

16. The drill according to claim 8, wherein the increase to at least one and a half times the fluted land width (26) takes place within one turn of the fluted land.

17. A drill, comprising:
   a drill helix (12) having a drill end and a shank end, wherein fluted lands (20) helically extend around a core, wherein said fluted lands are symmetrical in a cross sectional view taken along an axis that is perpendicular to a longitudinal axis of the drill, wherein grooves (18) remain between the fluted lands (20), said grooves having a width (72) that exceeds the spine thickness or width of the fluted lands (20), and wherein the grooves (18) comprise a convex core reinforcement (22) at the groove bottom thereof,
   wherein the width (24) of the fluted lands (20) at the drill end (16) is smaller than at the shank end (14) of the drill helix (12), and decreases in certain areas, and wherein a cross sectional maximum width of the core reinforcement (22) taken perpendicular to the longitudinal axis of the drill is greater towards the shank end (14) than at the drill end (16).

18. The drill according to claim 17, wherein the fluted lands increase in width from the drill end toward the shank end, and wherein the core reinforcement at the drill end is configured to be more slender and thus narrower than at the shank end.

19. The drill according to claim 17, wherein the core reinforcement (22) has larger radii (40, 42) of convexity towards the shank end (14) than at the drill end (16) of the core reinforcement.

* * * * *